United States Patent
Tsukiana et al.

(10) Patent No.: US 8,273,170 B2
(45) Date of Patent: Sep. 25, 2012

(54) INK COMPOSITION

(75) Inventors: Kazuaki Tsukiana, Nagano (JP); Takashi Oyanagi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 12/986,338

(22) Filed: Jan. 7, 2011

(65) Prior Publication Data

US 2011/0178214 A1    Jul. 21, 2011

(30) Foreign Application Priority Data

Jan. 8, 2010 (JP) ................................ 2010-002976

(51) Int. Cl.
*C09D 11/10* (2006.01)

(52) U.S. Cl. ....... 106/404; 106/31.9; 106/403; 524/441; 524/588; 523/160

(58) Field of Classification Search .................. 523/160, 523/161; 106/31.9
See application file for complete search history.

(56) References Cited

U.S. PATENT DOCUMENTS

| 7,303,619 | B2 | 12/2007 | Oyanagi |
| 7,513,945 | B2 | 4/2009 | Nakano et al. |
| 7,763,108 | B2 | 7/2010 | Oyanagi et al. |
| 2008/0145628 | A1 | 6/2008 | Oyanagi et al. |
| 2008/0213518 | A1 | 9/2008 | Oyanagi et al. |
| 2009/0214833 | A1 | 8/2009 | Oyanagi et al. |
| 2010/0253755 | A1 | 10/2010 | Oyanagi et al. |

FOREIGN PATENT DOCUMENTS

| JP | 2005-68250 A | 3/2005 |
| JP | 2005-68251 A | 3/2005 |
| JP | 2006265524 A | 10/2006 |
| JP | 2007-16103 A | 1/2007 |
| JP | 2007-23161 A | 2/2007 |
| JP | 2007-46034 A | 2/2008 |
| JP | 2008174712 A | 7/2008 |
| JP | 2008-239951 A | 10/2008 |
| JP | 2010-121141 A | 6/2010 |

*Primary Examiner* — David W Wu
*Assistant Examiner* — Vu A Nguyen
(74) *Attorney, Agent, or Firm* — Nutter McClennen & Fish LLP; John J. Penny, V.

(57) ABSTRACT

An ink jet ink composition containing an aralkyl-modified silicone surfactant, an organic solvent, and a metallic pigment.

7 Claims, No Drawings

INK COMPOSITION

CROSS-REFERENCE TO RELATED APPLICATIONS

The entire disclosure of Japanese Patent Application No. 2010-002976, filed Jan. 8, 2010 is expressly incorporated by reference herein.

BACKGROUND

1. Technical Field

The present invention relates to an ink composition.

2. Related Art

There have been many applications of ink jet printing in recent years. One of the applications is metallic printing. In order to achieve high-quality metallic printing, it is important to use an ink composition having a high degree of metallic luster. Accordingly, an ink composition exhibiting superior metallic luster is desired.

For example, the present inventors have proposed an ink composition containing a polyester-modified or polyether-modified silicone surfactant. This ink composition has a high degree of metallic luster (Patent Document 1).

[Citation List]
[Patent Document]
 [Patent Document 1] JP-A-2008-174712

SUMMARY OF INVENTION

Problems to be Solved by the Invention

However, the ink composition disclosed in the above Patent Document 1, in view of practical use, is susceptible to further improvement to enhance the metallic luster.

One of the important factors of the quality of metallic print images is the sharpness of the glossy surfaces. Since a high sharpness of a glossy surface can be achieved by use of an ink composition having a high rub fastness as well as metallic luster, such an ink composition is highly desired.

Summary

Accordingly, an object of the invention is to provide an ink composition having still higher metallic luster and rub fastness than known ink compositions.

Means for Solving the Problems

The present inventors have conducted intensive research to solve the above issue. As a result, they have found that the above issue can be solved by use of an ink composition containing an aralkyl-modified silicone surfactant instead of a polyester-modified or polyether-modified silicone surfactant, and have accomplished the present invention.

The present invention is as follows:

[1]
An ink composition containing an aralkyl-modified silicones surfactant, an organic solvent, and a metallic pigment.

[2]
The ink composition according to [1], wherein the organic solvent is a mixture containing at least two compounds selected from the group consisting of alkylene glycol diethers, alkylene glycol monoethers and lactones.

[3]
The ink composition according to [1] or [2], wherein the metallic pigment is flat particles.

[4]
The ink composition according to any one of [1] to [3], wherein the metallic pigment is aluminum or an aluminum alloy.

[5]
The ink composition according to nay one of [1] to [4], wherein the metallic pigment is prepared by pulverizing a vapor-deposited metal film.

[6]
The ink composition according to any one of [1] to [5], wherein the ink composition has a surface tension of 20 to 50 mN/m.

[7]
The ink composition according to any one of [1] to [6], wherein the ink composition has a viscosity of 8 mPa·s or less at 20° C.

DETAILED DESCRIPTION OF EXEMPLARY EMBODIMENT

An embodiment of the invention will now be described in detail. The invention is not limited to the following embodiment, and various modifications may be made within the scope of the content of the invention.

[Ink Composition]

An embodiment of the invention relates to an ink composition. The ink composition contains an aralkyl-modified silicone surfactant, an organic solvent, and a metallic pigment. The ink composition may contain a resin.

The ink composition can be advantageously used for further enhancing the quality of metallic printing, which is one of the applications of the ink jet technique. The constituents contained in the ink composition will be described below.

[Surfactant]
(Material)

The surfactant used in the present embodiment is an aralkyl-modified silicone surfactant.

The aralkyl-modified silicone is not particularly limited, and may be, for example, a silicone synthesized by introducing an organic group having an aryl-substituted lower alkyl group to a dialkyl silicone, such as dimethyl silicone. Examples of the aralkyl-modified silicone include silicones prepared by substituting benzyl, phenylalkyl, naphthylalkyl or the like for some of the methyl groups of dimethyl silicone, which has a structure whose silicon atoms each have two methyl groups. An example of the phenylalkyl group can be a group expressed by the following chemical formula (1):

[Chemical Formula 1]

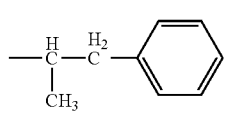

(1)

The aralkyl-modified silicone surfactant is not particularly limited, and may be, for example, an aralkyl-modified polymethylalkyl siloxane.

Commercially available aralkyl-modified silicone surfactants include, for example, KF-410 (produced by Shin-Etsu Chemical Co., Ltd.); and BYK-322 and BYK-323 (each produced by BYK Japan KK.).

The ink composition of the present embodiment may further contain other surfactants, such as acetylene glycol surfactants and silicone surfactants other than aralkyl-modified silicone surfactants, within the range not departing from the object of the invention.
(Composition)

Preferably, the surfactant content is 0.05% to 0.25% by mass, more preferably 0.1% to 0.20% by mass, and still more preferably 0.20% by mass, relative to the total mass of the ink composition. In these ranges, the ink composition can be improved in affinity (wettability) to the recording medium, and accordingly can exhibit a rapid fixability.

[Metallic Pigment]

The metallic pigment used in the present embodiment is preferably prepared by pulverizing a vapor-deposited metal film, and is preferably in form of flat particles. In the following description, the main surface of the flat particle has a length a, a width b, and a thickness d.

The flat particle refers to a particle having a substantially even surface (main surface) and a substantially uniform thickness (d). Since the flat particles are formed by pulverizing a vapor-deposited metal film, the particles can be metal particles having substantially even surfaces and a substantially uniform thickness. Therefore, the long diameter of the main surface of the flat particle can be defined by a, the short diameter can be defined by b, and the thickness can be defined by d.

The main surface may be an oval surface defined by a long diameter (a) and a short diameter (b).

A "equivalent circle diameter" is the diameter of a circle having the same projected area as the area formed by projecting the main surface of a flat particle of the metallic pigment in the thickness (d) direction of the metallic pigment particle. For example, if the main surface of the flat particle of the metallic pigment is polygonal, the plane formed by projecting the polygonal shape in the thickness (d) is converted into a circle, and the diameter of the circle is defined as the equivalent circle diameter of the flat particle of the metallic pigment.

The 50% average particle size R50 in terms of the equivalent circle diameter obtained from the areas of the main surfaces of the flat particles is preferably 0.5 to 3 μm, more preferably 0.75 to 2 μm, from the viewpoint of high metallic luster and good printing stability. If the 50% average particle size R50 is less than 0.5 μm, the glossiness is insufficient. In contrast, if the 50% average particle size R50 is more than 3 μm, the printing stability is degraded.

In addition, the 50% average particle size R50 in terms of the equivalent circle diameter and the thickness d preferably have the relationship R50/d>5, from the viewpoint of ensuring superior metallic luster. If R50/d is 5 or less, the glossiness is insufficient.

Furthermore, the maximum particle size Rmax of the equivalent circle diameter obtained from the areas of the main surfaces of the flat particles is preferably 10 μm or less, from the viewpoint of preventing ink jet recording apparatuses from being clogged with the ink composition. By controlling the Rmax to 10 μm or less, the nozzles of the ink jet recording apparatus and the mesh filter or the like provided in the ink flow channel can be prevented from being clogged.

The metallic pigment is not particularly limited as long as it has a function of metallic luster or the like. Preferably, it contains aluminum or an aluminum alloy, or silver or a silver alloy. Among these, aluminum or an aluminum alloy is preferred from the viewpoint of cost efficiency and the viewpoint of ensuring a superior metallic luster. If an aluminum alloy is used, the metallic element or nonmetallic element that can be combined with aluminum is not particularly limited as long as it has a function of having metallic luster or the like, and examples of such an element include silver, gold, platinum, nickel, chromium, tin, zinc, indium, titanium, and copper. At least one of simple substances, alloys and mixtures of these elements is preferably used.

In a method for preparing the metallic pigment, for example, a structure (hereinafter referred to as "a pigment material") including on the surface of a base sheet a releasing resin layer and a metal or alloy layer in that order is split at the interface between the metal or alloy layer and the releasing resin layer so that the metal or alloy layer is peeled from the base sheet and pulverized into flat particles. Flat particles having a sphere-equivalent 50% average particle size (D50) of 0.8 to 1.2 μm measured by a below-described light scattering method are screened out of the prepared flat particles. Alternatively, flat particles are screened out which have a 50% average particle size R50 of 0.5 to 3 μm satisfying the relationship R50/d>5 in terms of the equivalent circle diameter calculated from the areas of the main surfaces of the prepared flat particles having a long diameter a, a short diameter b and a thickness d.

The sphere-equivalent 50% average particle size obtained by a light scattering method is measured and determined as below. Specifically, diffracted or scattered light generated by irradiating particles in a disperse medium with light is measured with detectors disposed at the front, side and rear, and the 50% average particle size is defined by the intersection of the cumulative percentage distribution curve of measured average particle sizes and the horizontal axis representing a cumulative percentage of 50%.

The above sphere-equivalent average particle size refers to the average particle size calculated from measurement results, with the assumption that particles, which are naturally indefinite in shape, are spherical. The measuring apparatus may be, for example, a laser diffraction/scattering particle size distribution analyzer LMS-2000e manufactured by Seishin Enterprise Co., Ltd. When the sphere-equivalent 50% average particle size (D50) measured by the light-scattering method is within the above range, a coating having a superior metallic luster can be formed on printed matter, and in addition, the ink can be ejected stably from nozzles.

The long diameter a, short diameter b and equivalent circle diameter of the main surfaces of the flat particles of the metallic pigment can be measured with a particle image analyzer. For example, a flow particle image analyzer FPIA-2100, FPIA-3000 or FPIA-3000S manufacture by manufactured by SYSMEX CORPORATION may be used as the particle image analyzer.

The particle size distribution (CV value) of the flat particles of the metallic pigment can be obtained from the following equation (1):

[Equation 1]

$$CV\ \text{value} = (\text{standard deviation of particle size distribution}/\text{average of particle size}) \times 100 \quad (1)$$

The CV value obtained is preferably 60 or less, more preferably 50 or less, and still more preferably 40 or less. By selecting a metallic pigment having a CV value of 60 or less, the effect of achieving superior printing stability can be produced.

Preferably, the metal or alloy layer is formed by vacuum vapor deposition, ion plating, or sputtering.

The metal or apply layer is formed to a thickness preferably in the range of 5 to 100 nm, more preferably in the range of 20 to 100 nm. Consequently, the resulting pigment has an average thickness preferably in the range of 5 to 100 nm, more preferably in the range of 20 to 100 nm. By setting the thickness to 5 nm or more, the reflectivity and the brilliance of the pigment can be increased to enhance the performance of the metallic pigment. By setting the thickness to 100 nm or less, the pigment ensures a dispersion stability without increasing the apparent specific gravity.

The releasing resin layer of the pigment material acts as an undercoat layer of the metal or alloy layer and as a releasing layer for making it easy to peel the metal or alloy layer from the base sheet. The resin used in the releasing resin layer is preferably at least one selected from the group consisting of polyvinyl alcohol, polyvinyl butyral, polyethylene glycol, polyacrylic acid, polyacrylamide, cellulose derivatives such as cellulose acetate butyrate (CAB), acrylic polymers, and modified nylon resins.

A solution containing at least one of these resins is applied onto a recording medium and dried, thus forming a layer. After the application, an additive, such as a viscosity adjuster, may be added.

For the application for forming the releasing resin layer, a conventional method can be used, such as gravure coating, roll coating, blade coating, extrusion coating, dip coating, or spin coating. After application and drying, the surface of the releasing resin layer may be planarized by calendaring, if necessary.

The thickness of the releasing resin layer is not particularly limited, and is preferably 0.5 to 50 μm, more preferably 1 to 10 μm. If the thickness is less than 0.5 μm, the amount of resin is insufficient for use as a dispersion resin. If the thickness is more than 50 μm, the metal or alloy layer is likely to separate at the interface with the pigment layer when it is rolled.

Examples of the base sheet include, but are not limited to, releasable films, such as polytetrafluoroethylene, polyethylene, polypropylene, polyester films including polyethylene terephthalate, polyamide films including 66-nylon and 6-nylon, polycarbonate films, triacetate films, and polyimide films. Polyethylene terephthalate and its copolymers are preferably used for the base sheet.

The thickness of the base sheet is not particularly limited, but is preferably 10 to 150 μm. A base sheet having a thickness of 10 μm or more does not have a problem with handling in the manufacturing process. A base sheet having a thickness of 150 μm or less is so flexible as not to have problems with rolling and releasing.

The metal or alloy layer may be disposed between protective layers as disclosed in JP-A-2005-68250. The protective layer can be a silicon oxide layer or a protective resin layer.

The silicon oxide layer is not particularly limited as long as it contains silicon oxide. Preferably, the silicon oxide layer is formed of a silicon alkoxide, such as tetraalkoxysilane, or its polymer by a sol-gel method.

A solution containing a silicon alkoxide or its polymer dissolved in an alcohol is applied and heated to form a silicon oxide coating.

The protective resin layer is not particularly limited as long as it is a resin not dissolved in disperse media, and examples include polyvinyl alcohols, polyethylene glycols, polyacrylic acids, polyacrylamides, and cellulose derivatives. Among these, preferably, the protective resin layer is formed of a polyvinyl alcohol or a cellulose derivative.

An aqueous solution containing at least one of those resins is applied and dried to form a layer. An additive, such as a viscosity adjuster, may be added to the aqueous solution.

The application of silicon oxide or resin is performed by the same method as in the formation of the releasing resin layer.

The thickness of the protective layer is not particularly limited, but is preferably in the range of 50 to 150 nm. If the thickness is less than 50 nm, the protective layer does not have a sufficient mechanical strength. If the thickness is more than 150 nm, it is too strong to be pulverized and dispersed, and in addition, may cause separation at the interface with the metal or alloy layer.

A color material layer may be disposed between the protective layer and the metal or alloy layer, as disclosed in JP-A-2005-68251.

The color material layer is intended to impart a desired color to the pigment, and is not particularly limited as long as it can contain a color material capable of imparting a desired color and hue in addition to the metallic luster and brilliance of the metallic pigment of the invention. The color material of the color material layer may be either a dye or a pigment. The dye or pigment can be appropriately selected from known materials.

The "pigment" used in the color material layer refers to the pigment defined in the field of general pigment chemistry, including natural pigment, synthetic organic pigment and synthetic inorganic pigment, and is different from the pigment of the multilayer structure in the present invention.

Preferably, the color material layer is formed by, but not limited to, coating.

If the color material in the color material layer is a pigment, preferably, the color material layer further contains a resin for dispersing the color material. Preferably, the resin for dispersing the color material is dissolved or dispersed in a solvent together with the pigment and optionally other additives. The solution is spin-coated to form a liquid coating, and the coating is dried to form a resin thin film.

It is preferable that both the color material layer and the protective layers be formed by coating in terms of work efficiency in the process for preparing the pigment material.

The pigment material may have a layered structure including a plurality of multilayer structures including the above-described releasing resin layer and metal or alloy layer and further a protective layer in that order. In this instance, the total thickness of the multilayer structure including the plurality of metal or alloy layers, that is, the thickness of the metal or alloy layer/releasing resin layer/metal or alloy layer structure or the releasing resin layer/metal or alloy layer structure, not including the base sheet and the releasing resin layer immediately above the base sheet, is preferably 5000 nm or less. When the thickness is 5000 nm or less, the pigment material can be rolled without cracks or separation, and is thus superior in storage stability. Also, the resulting pigment exhibits superior brilliance and is thus favorable.

The pigment material may have, but is not limited to, a structure in which a multilayer structure including the releasing resin layer and the metal or alloy layer in that order is disposed on both surfaces of the base sheet.

The method for peeling from the base sheet is not particularly limited, but any of the flowing methods can be preferably applied. Specifically, peeling may be performed by a method of jetting a liquid (solvent) onto the pigment material and scraping the metal or alloy layer out of the material, a method of immersing the pigment material in a liquid, or a method of sonicating the pigment material simultaneously with immersing the material in a liquid to peel the pigment and pulverize the peeled pigment. These methods allow the collection of the liquid used for peeling as well as the peeled metal or alloy layer. The liquid (solvent) used for the peeling may be a glycol ether solvent or a lactone solvent, or a mixture of these solvents.

For pulverizing the peeled metal or alloy layer into fine particles, any known method using a ball mill, a bead mill, ultrasonic waves or a jet mill can be applied without particular limitation. Thus a metallic pigment can be prepared.

In the pigment prepared as above, the releasing resin layer acts as a protective colloid, so that a stable pigment-dispersed liquid can be prepared by merely dispersing the pigment in a solvent. In the ink composition containing this pigment, the resin of the releasing resin layer functions to impart adhesion with the recording medium, such as paper.

In the present embodiment, the metallic pigment content in the ink composition is preferably 0.1% to 3.0% by mass, more preferably 0.5% to 2.0% by mass, if only one ink composition in an ink set is a metallic ink. If the metallic pigment content in the ink composition is 0.5% by mass or more and less than 1.7% by mass, a half mirror-like glossy surface or glossy texture can be produced by ejecting an amount of ink insufficient to cover the print surface. In such a case, a texture through which the background seems to be seen can be printed, and a metallic luster surface superior in glossiness can be formed by ejecting an amount of ink sufficient to cover the print surface. Accordingly, the ink composition is suitable, for example, for forming a half mirror image on a transparent recording medium, or for expressing a highly glossy surface having a metallic luster.

If the metallic pigment content in the ink composition is in the range of 1.7% to 2.0% by mass, the metallic pigment is deposited on the print surface in a random manner and accordingly can produce a metallic luster surface seeming to be matt, not having high glossiness. Thus, it is suitable to form, for example, a shielding layer on a transparent recording medium.

The ink composition of the present embodiment may contain a disperse medium to disperse the metallic pigment. Examples of the disperse medium include, but are not limited to, glycol ethers, such as diethylene glycol diethyl ether, triethylene glycol monobutyl ether, dipropylene glycol dimethyl ether, dipropylene glycol diethyl ether, and ethylene glycol monoallyl ether; ether acetates, such as propylene glycol methyl ether acetate; lactones, such as γ-butyrolactone; and alcohols, such as isopropyl alcohol.

[Organic Solvent]

Although the organic solvent used in the present embodiment is not particularly limited, polar organic solvents can be preferably used. Exemplary polar organic solvents include alcohols (for example, methyl alcohol, ethyl alcohol, propyl alcohol, butyl alcohol, isopropyl alcohol, fluoroalcohol, etc.), ketones (for example, acetone, methyl ethyl ketone, cyclohexanone, etc.), carboxylic acid esters (for example, methyl acetate, ethyl acetate, propyl acetate, butyl acetate, methyl propionate, ethyl propionate, etc.), and ethers (for example, diethyl ether, dipropyl ether, tetrahydrofuran, dioxane, etc.). These organic solvents may be used singly or in combination.

If the ink composition contains two or more organic solvents, it is preferable that at least one of the disperse medium and the organic solvents contains at least one of the disperse media and organic solvents that are uniformly miscible with water. More preferably, at least one of the disperse media and the organic solvents is at least either a disperse medium or an organic solvent that is uniformly miscible with water.

In particular, the organic solvent preferably contains at least one alkylene glycol ether, which is liquid at room temperature and normal pressure.

Alkylene glycol ethers include ethylene glycol ethers and propylene glycol ethers having an aliphatic group, such as methyl, n-propyl, i-propyl, n-butyl, i-butyl, hexyl, or 2-ethylhexyl, or a group having a double bond, such as allyl or phenyl. These compounds are colorless and less odor, and are liquid at room temperature having features of both alcohols and ethers because of the ether group and hydroxy group of their molecules. Also, alkylene glycol ethers include monoethers prepared by substituting only one of the hydroxy groups and diethers prepared by substituting both hydroxy groups. These alkylene glycol ethers may be used in combination.

Preferably, the organic solvent is a mixture containing at least two selected from the group consisting of alkylene glycol diethers, alkylene glycol monoethers and lactones.

Exemplary alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether.

Exemplary alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

An alkylene glycol monoalkyl ether acetate can be used as one of the derivatives of the above compounds. Exemplary alkylene glycol monoalkyl ether acetates include ethylene glycol monoethyl ether acetate, diethylene glycol monoethyl ether acetate, propylene glycol ether acetate, and dipropylene monoethyl ether acetate.

Exemplary lactones include γ-butyrolactone, δ-valerolactone, and ε-caprolactone.

Thus, it can be said that the ink composition of the present embodiment is a solvent-based metallic ink composition for ink jet printing that can print a superior metallic luster surface.

[Resin]

The ink composition of the present embodiment may contain a resin. Examples of the resin include acrylic resins produced from at least one of acrylic esters and methacrylic esters, styrene-acrylic resins that are copolymers of those acrylic resins and styrene, rosin-modified resins, terpene resins, modified terpene resins, polyester resins, polyamide resins, epoxy resins, vinyl chloride resins, vinyl chloride-vinyl acetate copolymers, cellulose resins (for example, cellulose acetate butyrate and hydroxypropyl cellulose), polyvinyl butyral, polyacrylic polyol, polyvinyl alcohol, polyurethane, and hydrogenated petroleum resins.

Also, nonaqueous emulsion polymer particles (NAD, Non Aqueous Dispersion) can be used as the resin. This is a dispersion liquid in which fine particles of polyurethane resin, acrylic resin or acrylic polyol resin are stably dispersed in an organic solvent.

Examples of the polyurethane resin include SANPRENE IB-501 or SANPRENE IB-F370 produced by Sanyo Chemical Industries, Ltd. The acrylic polyol resin may be, for example, N-2043-60 MEX produced by Harima Chemicals, Inc. The resin emulsion is preferably added in an amount of 0.1% to 10% by mass to the ink composition in order to further enhance the fixability of the pigment to the recording medium. If the amount added is excessively high, a sufficient printing stability cannot be obtained. If the amount added is excessively low, the fixability becomes insufficient. From the same viewpoint, the resin content in the ink composition is preferably 0.05% to 1.5% by mass, more preferably 0.1% to 1.0% by mass, still more preferably 0.15% to 0.35% by mass, and particularly preferably 0.15% 0.25% by mass.

The resin in the ink composition is preferably at least one selected from the group consisting of polyvinyl butyral, cellulose acetate butyrate, and polyacrylic polyol, and is more preferably cellulose acetate butyrate. Such a preferred composition can produce favorable effects of exhibiting high rub fastness and fixability when it is dried, and of being high metallic luster.

[Other Constituents]

The ink composition of the present embodiment may further contain other constituents, and preferably contains at least one of glycerin, polyalkylene glycols and saccharides. The total content of at least one of glycerin, polyalkylene glycols and saccharides is preferably 0.1% to 10% by mass in the ink composition. Such a preferred composition can suppress the ink from drying and prevent clogging, and thus can stabilize ink ejection to enhance the image quality of recorded matter.

Polyalkylene glycols are linear polymers containing a repetitive structure of ether bonds in the main chain, and can be produced by, for example, ring-opening polymerization of a cyclic ether.

Exemplary alkylene glycols include polymers such as polyethylene glycol and polypropylene glycol, ethylene oxide-propylene oxide copolymers and their derivatives. Any type of random copolymer, block copolymer, graft copolymer and alternating copolymer can be used as the copolymer.

An example of preferred polyalkylene glycols may be expressed by the following chemical formula (2):

[Chemical Formula 2]

$$HO\text{—}(C_nH_{2n}O)_m\text{—}H \tag{2}$$

(In the above formula, n represents an integer of 1 to 5, and m represents an integer of 1 to 100.)

The integer n of $(C_nH_{2n}O)_m$ of the above formula may be a single constant or a combination of two or more numbers, within the range of n. For example, when n is 3, the $(C_nH2_nO)_m$ is $(C_3H_6O)_m$; when n is the combination of 1 and 4, the $(C_nH_{2n}O)_m$ is $(CH_2O\text{—}C_4H_8O)_m$. Also, the integer m may be a single constant or a combination of two or more numbers, within the range of m. For example, when m is the combination of 20 and 40, the $(C_nH_{2n}O)_m$ of the above example may be $(CH_2O)_{20}\text{—}(C_2H_4O)_{40}$; when m is the combination of 10 and 30, it may be $(CH_2O)_{10}\text{—}(C_4H_8O)_{30}$. The integers n and m may be arbitrarily combined in the above ranges.

Exemplary saccharides include monosaccharides, such as pentose, hexose, heptose, and octose; polysaccharides, such as disaccharides, trisaccharides, and tetrasaccharides; and derivatives of these saccharides, such as reduced derivatives including sugar alcohols and deoxy acids, oxidized derivatives including aldonic acid and uronic acid, dehydrated derivatives including glycoseen, amino acids, and thio sugars. Polysaccharides refer to a type of saccharide in a broad sense, and include compounds existing widely in the natural world, such as alginic acids, dextrin and cellulose.

[Properties of Ink Composition]

The present inventors have confirmed that the phenomenon of ink bleeding on a recording medium can be avoided by controlling the surface tension and viscosity of the ink composition to a predetermined range.

The surface tension of the ink composition of the present embodiment is preferably 20 to 50 mN/m, more preferably 20 to 40 mN/m, and still more preferably 20 to 30 mN/m. When the surface tension is in the above range, the phenomenon of ink bleeding on a recording medium can be avoided effectively. The surface tension mentioned herein is a value measured by the method that will be described later in Examples.

The viscosity at 20° C. of the ink composition of the present embodiment is preferably 8 mPa·s or less, more preferably 5 mPa·s or less, and still more preferably 2 to 5 mPa·s. When the viscosity is in the above range, the phenomenon of ink bleeding on a recording medium can be avoided effectively. The viscosity at 20° C. mentioned herein is a value measured by the method that will be described later in Examples.

Preferably, the rub fastness of the ink composition of the present embodiment is in level "A", which means that the ink is not separated, in the measurement and evaluation in Examples. The rub fastness mentioned herein is measured and evaluated by the method that will be described later in Examples.

The preferred value and measuring method of the glossiness of the ink composition of the present embodiment will be described later.

Thus, the present embodiment can provide an ink composition having much superior metallic luster and rub fastness to known ink compositions while it can avoid ink bleeding on a recording medium or maintain the viscosity and surface tension at the same levels as the known ink compositions.

[Ink Jet Recording Method]

The ink jet recording method according an embodiment of the present invention performs record by ejecting droplets of the above-described ink composition to deposit on a recording medium.

If the recording medium does not have an ink receiving layer, it is preferable that the recording medium be heated for printing, from the viewpoint of producing superior glossiness. In this instance, the heating temperature is preferably 30 to 50° C., and more preferably 35 to 45° C.

Heating is performed by a method of bringing the recording medium into contact with a heat source, or a method of heating without contact with the recording medium by irradiating the recording medium with infrared rays, microwaves (electromagnetic waves having a maximum wavelength around 2,450 MHz) or the like or by blowing hot air over the recording medium.

Preferably, the heating is performed simultaneously with printing. In other words, the heating of a recording medium may be performed over the period for printing. The heating temperature is preferably 30 to 80° C., and more preferably 35 to 45° C., depending on the type of the recording medium.

The ink jet recording method of the present embodiment uses the above-described ink composition, and the ink composition can suppress undesired chemical reactions and reduce the degradation of glossiness and generation of gases, even under high temperature environment.

EXAMPLES

The embodiment of the present invention will now be further described in detail with reference to Examples, but the embodiment is not limited to those Examples.

Example 1

(1. Preparation of Metallic Pigment-Dispersed Liquid)

A resin layer coating liquid containing 3% by mass of cellulose acetate butyrate (butyration degree: 35% to 39%, produced by KANTO CHEMICAL CO., INC.) and 97% by mass of diethylene glycol diethyl ether (produced by Nippon Nyukazai Co., Ltd.) was uniformly applied on a 100 μm thick PET film by a bar code method. Then, the coating was dried at 60° C. for 10 minutes to form a resin layer thin film on the PET film.

Subsequently, a vapor-deposited aluminum layer having an average thickness of 20 nm was formed on the resin layer using a vacuum vapor deposition apparatus VE-1010 (manufactured by VACUUM DEVICE INC.).

Then, the resulting multilayer composite was simultaneously subjected to peeling, pulverization and dispersion in diethylene glycol diethyl ether using an ultrasonic dispersion apparatus VS-150 (manufactured by AS ONE Corporation), and thus a metallic pigment-dispersed liquid was prepared which had been subjected to ultrasonic dispersion for 12 hours in total time.

The obtained metallic pigment-dispersed liquid was filtered through a SUS mesh filter with an opening of 5 μm to remove coarse particles. Subsequently, the filtrate was placed in a round-bottom flask, and diethylene glycol diethyl ether was evaporated using a rotary evaporator. Thus the metallic pigment-dispersed liquid was concentrated, and then the concentration of the metallic pigment-dispersed liquid was adjusted to yield a metallic pigment-dispersed liquid containing 5% by mass of metallic pigment.

The sphere-equivalent 50% average particle size (D50) of the metallic pigment was measured by a light-scattering method with a laser diffraction/scattering particle size analyzer LMS-2000e manufacture by Seishin Enterprise Co., Ltd., and the result was 1.001 μm. Also, the largest particle size was 5.01 μm.

Furthermore, the water content in the metallic pigment-dispersed liquid was measured with a micro-moisture meter FM-300A manufactured by Kett Electric Laboratory, and the result was 0.58% by mass. The water content in the diethylene glycol diethyl ether (produced by Nippon Nyukazai Co., Ltd.) was 0.38% by mass.

(2. Preparation of Metallic Pigment Ink Composition)

Metallic ink compositions shown in the following Table 1 were prepared using the pigment-dispersed liquid prepared by the above method. The solvent and additives were mixed and dissolved into an ink solvent. Then, the metallic pigment-dispersed liquid was added to the ink solvent, and mixed and stirred at room temperature and normal pressure for 30 minutes with a magnetic stirrer to yield a metallic pigment ink composition.

The organic solvents used were diethylene glycol diethyl ether (DEGdEE), tetraethylene glycol dimethyl ether (TEGdME) and tetraethylene glycol monobutyl ether (TEGmBE)(each produced by Nippon Nyukazai Co., Ltd.), and γ-butyrolactone (γ-BL) (produced by KANTO CHEMICAL CO., INC.). The resin used was cellulose acetate butyrate (CAB) (produced by KANTO CHEMICAL CO., INC., butyration degree: 35% to 39%). The surfactant used was an aralkyl-modified methyl alkyl siloxane (BYK-323, produced by BYK Japan KK.). The unit is percent by mass basis.

Comparative Example 1

A metallic pigment ink composition shown in Table 1 was prepared in the same manner as in Example 1 except that an acrylic group-containing polyether-modified polydimethyl siloxane (BYK-UV3500, produced by BYK Japan KK.) was used as the surfactant in "2. Preparation of metallic pigment ink composition".

Comparative Example 2

A metallic pigment ink composition shown in Table 1 was prepared in the same manner as in Example 1 except that an acrylic group-containing polyester-modified polydimethyl siloxane (solution) (BYK-UV3570, produced by BYK Japan KK.) was used as the surfactant in "2. Preparation of metallic pigment ink composition".

TABLE 1

|  | Example 1 | Comparative Example 1 | Comparative Example 2 |
| --- | --- | --- | --- |
| Aluminum content (solid content in metallic pigment-dispersed liquid) | 24 | 24 | 24 |
| CAB | 8 | 8 | 8 |
| DEGdEE | 39.8 | 39.8 | 39.8 |
| γ-BL | 10 | 10 | 10 |
| TEGdME | 15 | 15 | 15 |
| TEGmBE | 3 | 3 | 3 |
| BYK-323 | 0.2 | — | — |
| BYK-UV3500 | — | 0.2 | — |
| BYK-UV3570 | — | — | 0.2 |

(3. Evaluation Tests)

(1) Glossiness Test

The ink compositions of Example 1 and Comparative Examples 1 and 2 were placed in the cyan lines of respective ink jet printers (SP-300V, manufactured by Roland DG Corporation). Then, solid printing was performed on Roland DG Corporation paper (product number: SV-G-610G) in a high resolution mode in an environment of room temperature. This solid printing was performed in a condition in which the recording medium was heated to 40° C.

The glossiness at 20 degrees was measured with a glossmeter GM-286 manufactured by Konica Minolta Holdings, Inc. The results are shown in Table 2 below.

(2) Rub Fastness Test

For the test, the occurrence of separation of ink from recorded matter was measured after rubbing 100 times at a load of 500 g with a Gakushin-type rubbing tester (manufacture by TESTER SANGYO CO., LTD.). In this test, the recorded matter was the printed matter produced by the abode-described solid printing. The criteria of rub fastness were as follows:

A: Ink separation did not occur even by use of the Gakushin-type rubbing tester.

B: Ink separation occurred by use of the Gakushin-type rubbing tester.

The test results are shown in Table 2 below.

(3) Viscosity Test

The viscosities at 25° C. of the ink compositions of Example 1 and Comparative Examples 1 and 2 were measured with a rheometer (MCR300, manufactured by Paar Physca). The results are shown in Table 2 below.

(4) Surface Tension Test

The surface tension was measured at 20° C. by a platinum plate method with an automatic surface tensiometer (CBVP-A3, manufactured by Kett Electric Laboratory). The results are shown in Table 2 below.

TABLE 2

|  | Example 1 | Comparative Example 1 | Comparative Example 2 |
| --- | --- | --- | --- |
| Glossiness (20 degrees) | 320 | 251 | 265 |
| Rub fastness | A | B | B |
| Viscosity (mPa · s) | 3.03 | 3.06 | 3.08 |
| Surface tension (mN/m) | 25.6 | 25.5 | 25.3 |

The results show that the ink composition (Example 1) according to the present invention exhibited higher metallic luster and rub fastness than the known ink compositions (Comparative Examples 1 and 2) while maintaining the viscosity and surface tension at the same levels as the known ink compositions.

What is claimed is:

1. An ink composition containing: an aralkyl-modified silicone surfactant; an organic solvent; and a metallic pigment.

2. The ink composition according to claim 1, wherein the organic solvent is a mixture containing at least two compounds selected from the group consisting of alkylene glycol diethers, alkylene glycol monoethers and lactones.

3. The ink composition according to claim 1, wherein the metallic pigment is flat particles.

4. The ink composition according to claim 1, wherein the metallic pigment is aluminum or an aluminum alloy.

5. The ink composition according to claim 1, wherein the metallic pigment is prepared by pulverizing a vapor-deposited metal film.

6. The ink composition according to claim 1, wherein the ink composition has a surface tension of 20 to 50 mN/m.

7. The ink composition according to claim 1, wherein the ink composition has a viscosity of 8 mPa·s or less at 20° C.

* * * * *